Patented Nov. 6, 1951

2,573,739

UNITED STATES PATENT OFFICE 2,573,739

FUNGICIDAL BASIC BERTHOLLIDE AND METHOD OF USING SAME

Fred R. Whaley, Kenmore, N. Y., assignor, by mesne assignments, to Union Carbide and Carbon Corporation, a corporation of New York No Drawing. Application December 18, 1947,
Serial No. 792,631

4 Claims. (Cl. 167—14)

This invention relates to the use of certain cadmium-containing complexes for the control of fungous diseases of plants, for example, the so-called "dollar spot" of fine turf grasses caused by *Sclerotinia homoeocarpa*, large "brown patch" caused by *Rhizoctonia solani*, and "snow mold" caused by *Fusarium nivali*, damping-off diseases, peach leaf curl caused by *Taphrina deformans*, and early and late blights of tomato caused, respectively, by *Alternaria solani* and *Phytophora infestans*.

It has heretofore been proposed to use Daltonian compounds, for example cadmium hydroxide and sulfate and certain organic cadmium compounds as fungicides, but they have distinct limitations particularly in relation to duration of effectiveness and flexibility of dosage.

The present invention is particularly concerned with unitary cadmium complexes having the characteristic that when an aqueous slurry is made containing more of the solid complex than will dissolve in the water, the cadmium solubility (that is, the amount of dissolved cadmium per unit weight of water) increases with increasing slurry concentration (that is, with increasing amount of solid complex) but the increase in cadmium solubility is less than in direct proportion to the slurry concentration.

In this respect the complex differs both from Daltonian compounds and mixtures of Daltonian compounds; for example with the Daltonian compound cadmium sulphate, the cadmium solubility is directly proportional to the amount of solid introduced into the water for unsaturated solutions; and above its saturation point, the cadmium solubility remains constant with increasing slurry concentration or, in other words, is independent of slurry concentration.

A cadmium, calcium, coper, zinc chromium complex which is more fully disclosed hereinafter (designated complex A) and is an example of the unitary cadmium complexes referred to above has the following cadmium solubility characteristics: A slurry of this product composed of $\frac{1}{10}$ gram of the complex per 100 milliliters of water (a 0.1% slurry) shaken to saturation of the water, gives 0.00003 gram of cadmium in solution per 100 mililiters of water at 20° C., whereas a tenfold increase in the slurry concentration (1 gram of the complex per 100 milliliters of water or a 1% slurry) gives 0.00007 gram of cadmium dissolved in 100 milliliters of water. The cadmium, copper, calcium, chromium complex, hereinafter designated complex B, in 1% and 10% slurries gives, respectively, 0.00003 gram and 0.00006 gram of dissolved cadmium, or only a twofold increase in dissolved cadmium for a tenfold increase in slurry concentration. The cadmium, calcium, chromium complex D in 1%, 5% and 10% slurries gives, respectively, 0.00009 gram, 0.00020 gram and 0.00023 gram of dissolved cadmium. The cadmium, copper, zinc, chromium complex E in 0.1%, 0.5%, 1% and 5% slurries gives, respectively, 0.00126 gram, 0.0029 gram, 0.0049 gram and 0.011 gram of dissolved cadmium. It will be seen that increased slurry concentration gives a continuous increased soluble cadmium concentration but that this is not proportional to the increase in slurry concentration, and hence these complexes do not behave as Daltonian compounds either above or below their saturation points, nor do they behave as Daltonian compounds going through the transition from unsaturation to saturation in the presence of excess solid since the solubility of such Daltonian compounds first increases proportionately and then, upon saturation, remains constant; nor do they behave as mixtures of Daltonian compounds wherein the cadmium solubility is the sum of the cadmium solubilities of the components.

The complexes contemplated herein are further characterized and distinguished from Daltonian compounds in that upon successive treatments with fresh portions of water the amount of cadmium brought into solution is progressively less, per unit weight of water, whereas a Daltonian compound has a constant solubility as long as sufficient solid remains to provide saturation; and with a Daltonian compound below its saturation point the entire amount is dissolved in the first treatment with water. With a mixture of Daltonian compounds of different solubilities, for instance the material hereinafter designated compound F, the cadmium solubility remains constant at a solubility which is the sum of the solubilities of the components until the excess of one component is exhausted, at which time the cadmium solubility assumes a new and lower constant level equal to the solubility of the remaining component.

Materials having the characteristics of the complexes described herein and explained above are referred to herein as non-Daltonian complexes or berthollides. They are considered to be compounds as distinguished from mixtures of Daltonian compounds which may, upon chemical analysis, show the same amounts of elements as are in the berthollides. The composition of the berthollide may vary by increments giving smooth variations of properties as the composition varies.

The unitary cadmium complex A which is typical of the materials contemplated herein has the formula $$Cd_6CU_{25}Zn_{10}Ca_{100}Cr_{10}S_{25}O_{246} \cdot 264H_2O$$

which may be written, in accordance with metallurgical practice, as $$6CdO \cdot 25CuO \cdot 10ZnO \cdot 100CaO \cdot 10CrO_3 \cdot 25SO_3 \cdot 264H_2O$$

this representing a firmly bonded complex association of the respective oxides, and not a mere mixture of oxides, with possibly excess lime, as indicated by the absence of characteristic oxide or hydroxide lines of all metals except calcium in X-ray patterns. On a weight basis, as shown by quantitative analysis, the material contains 4.5% CdO, 11.7% CuO, 4.8% ZnO, 32.9% CaO, 5.9% $CrO_3$, 11.7% $SO_3$, 28.5% $H_2O$. The $264H_2O$ represents water of hydration, which may vary depending upon how strongly the material is heated after being precipitated.

It is found that the unitary cadmium complexes contemplated herein are superior in duration of fungus control and flexibility of dosage to Daltonian compounds, for instance cadmium hydroxide and sulfate, and a commercial material the active ingredient of which is said to be phenyl amino cadmium dilactate, a mixture of Daltonian compounds, hereinafter designated compound F.

A number of different but typical cadmium complexes as well as cadmium compounds and commercial fungicides have been tested comparatively for the control of fungous diseases. For reference these materials will sometimes be designated as:

| Material | Composition |
|---|---|
| Complex A | As previously described. |
| Complex B | 4.0% CdO, 12.2% CuO, 34.4% CaO, 4.3% $CrO_3$, 1.4% $Na_2O$, 15.2% $SO_3$, 28.5% $H_2O$. |
| Complex C | 4.9% CdO, 12.7% CuO, 5.2% ZnO, 35.7% CaO, 16.1% $SO_3$, 25.4% $H_2O$. |
| Complex D | 4.6% CdO, 57.6% CaO, 5.1% $CrO_3$, 32.7% $H_2O$. |
| Complex E | 10.3% CdO, 31% CuO, 26.2% ZnO, 19.3% $CrO_3$, 13.2% $H_2O$. |
| Compound F | The aforesaid commercial phenyl amino cadmium dilactate. |
| Compound G | Mercurial chlorides; a mixture of one-third mercuric chloride and two-thirds mercurous chloride. |
| Compound H | Mercurial sulfate; ethyl mercury sulfate. |
| Compound I | Tetramethyl thiuram disulfide. CdO, $Cd(OH)_2$, $CdCl_2$, $CdSO_4$, CdS, CdSe. |

Selected and illustrative solubility data on certain of the foregoing cadmium compounds are: Cadmium oxide in suspensions containing 1 gram and 10 grams of the oxide per 100 milliliters of water gave a cadmium solubility of 0.00008 gram of cadmium in solution at 20° C. for both suspensions.

Suspensions of compound F containing 0.1 gram of the solid per 100 milliliters of water gave 0.0044 gram of soluble cadmium per 100 milliliters and suspensions containing 1 gram of the solid gave 0.044 gram of soluble cadmium. Analysis of compound F shows that 1 gram of the material contains 0.0585 gram of cadmium and the above solubility data show that when the material is suspended in water 75% of the cadmium dissolves regardless of the concentration of the solute. This shows the remaining cadmium component to be quite insoluble and that both components are Daltonian in character.

The results of certain tests using the above materials are as follows:

Spore germination tests were made according to the method disclosed in Phytopathology, July 1943, vol. XXXIII, No. 7, pages 627–632. In these laboratory spore germination tests where complex A, $CdCl_2$, CdS, and CdSe were compared, it was found that complex A was more effective than $CdCl_2$, CdS or CdSe in preventing spore germination, for example the L. D. 50 values, based on cadmium, to *Alternaria oleraceae*, a common test fungus, for complex A was 0.077 part per million by weight, of water; for $CdCl_2$ 1.85 parts per million; for CdS 62.2 parts per million; and for SdSe 58.8 parts per million.

Greenhouse tests were made according to the method disclosed in Contributions from Boyce Thompson Institute, 1943, vol. 13, at page 93 et seq. for control of disease and according to the method disclosed at page 172 for phytotoxicity.

In the tests for the control of early and late blight on tomato where the plants were sprayed with slurries containing 0.2% by weight of complex A and with the other materials listed below, at concentrations which gave an equivalent weight of cadmium, the results were:

TABLE 1

| Material Used | Per Cent Disease | |
|---|---|---|
| | Early Blight | Late Blight |
| Complex A | 4 | 3 |
| $CdCl_2$ | 13 | 15 |
| CdS | 42 | 79 |
| CdSe | 31 | 75 |
| none | 100 | 100 |

The sprays, solutions and slurries referred to herein contained only water and the material being tested. Whether the spray is a solution or a slurry depends, of course, upon the solubility of the material being tested.

In phytotoxicity tests on bean and tomato plants in the greenhouse using complex A, $CdCl_2$, Cds and CdSe as slurries or solutions at 2.0% concentration, complex A gave no injury to bean or tomato plants, CdS and CdSe gave no injury to the tomato and mild injury to the bean, while $CdCl_2$ severely injured both kinds of plants.

In another greenhouse test for the control of the blights on tomato where the plants were sprayed with slurries containing 0.2% by weight of complex A, B, C, and D, the results were:

TABLE 2

| Material Used | Per Cent Disease | |
|---|---|---|
| | Early Blight | Late Blight |
| Complex A | 2 | 2 |
| Complex B | 0 | 0 |
| Complex C | 0 | 0 |
| Complex D | 9 | 11 |
| none | 100 | 100 |

None of these materials injured the tomato plants at the above concentrations and in other phytotoxicity tests none injured either bean or tomato plants when applied as 1% sprays.

In another greenhouse test for the control of blights on tomato where the plants were sprayed with slurries or solutions containing 0.02% by weight of complex A, CdCl₂, CdS, CdSe, the results were:

TABLE 3

| Material Used | Per Cent Disease | |
|---|---|---|
| | Early Blight | Late Blight |
| Complex A (contains 4% Cd) | 7 | 16 |
| CdCl₂ (contains 61% Cd) | 5 | 27 |
| CdS | 54 | 74 |
| CdSe | 23 | 99 |
| none | 100 | 100 |

In another greenhouse test for the control of the blights on tomato where the plants were sprayed with slurries or solutions containing 0.04% of complex A and concentrations of other materials which gave equivalent amounts of cadmium, the results were:

TABLE 4

| Material Used | Per Cent Disease | |
|---|---|---|
| | Early Blight | Late Blight |
| Complex A | 20 | 6 |
| Complex E | 3 | 13 |
| CdO | 76 | 87 |
| Cd(OH)₂ | 43 | 91 |
| CdSO₄ | 11 | 82 |
| none | 100 | 100 |

In these tests complexes A and E did not injure the plants, the CdO and the Cd(OH)₂ gave slight injury and the CdSO₄ gave severe injury.

The results of these slide germination and greenhouse tests show that the soluble Daltonian compounds of cadmium are too phytotoxic to be used while the more insoluble Daltonian compounds are not effective in controlling diseases. However, the unitary cadmium complexes have such a combination of high fungicidal effectiveness and low phytotoxicity as to be valuable practical plant fungicides. Thus in these tests the complexes were not injurious to plants when used in concentrations as high as 2.0% and they were effective fungicides when used in concentrations as low as 0.02%. For this purpose those complexes can safely be use as fungicides over a hundredfold dosage range.

In comparative tests for the control of dollar spot, test materials containing cadmium were applied to turf as suspensions in water at the rate of approximately 3 grams of cadmium per 1000 sq. ft. The test also included treatments with compound G, which is now a more or less standard and accepted treatment of turf for the control of dollar spot, and treatments with compound I, which is now marketed as a fungicide. Compound G was applied as a spray at the rate of 3 ounces of the compound per 1000 sq. ft. Compound I was applied as a spray at the rate of 5 ounces per 1000 sq. ft. Each treatment was on four different plots and the first treatment was made on May 27, before the appearance of the disease, on turf which was heavily infested with dollar spot the previous year. Treatments were made approximately every thirty days and readings were taken approximately every seven days.

Untreated control plots showed an average of 172 spots per plot during the season. This average is based on ten counts taken at weekly intervals. Similar averages of the treated plots showed the following percent disease considering the disease on the untreated control plots as 100 percent. On the plots treated with complex A the average disease was 4.7% of the disease on the untreated plots; for complex B the disease was 1.4%; for complex C was 1.4%; for complex D was 3.1%; for compound F was 7.3%; for compound G was 8.6%; and for compound I was 51.9%.

The results of the foregoing test show that the unitary cadmium complexes are not only superior to standard fungicides now in use but are also superior to such organic Daltonian cadmium compounds as compound F.

A tabular presentation of a portion of the data from the foregoing test shows the superiority of the cadmium complexes over the cadmium Compound F, as regards duration of effectiveness. In the test from which the following data, Table 5, were derived, a single application of fungicide was made on May 27, at which time no spots were showing, and dollar spot counts were made on the dates shown. The numerals represent the number of spots.

TABLE 5

| May 27 | | 1st Reading June | 2nd Reading June 17 | 3rd Reading June 23 |
|---|---|---|---|---|
| Check (no treatment) | 0 | 20 | 38 | 64 |
| Treatment May 27 with: | | | | |
| Compound F | 0 | 5 | 5 | 19 |
| Complex A | 0 | 2 | 5 | 12 |
| Complex B | 0 | 1 | 0 | 6 |
| Complex C | 0 | 1 | 1 | 4 |
| Complex D | 0 | 2 | 2 | 9 |

From the records of the test described above, the details of the first three readings after the initial treatment indicate not only the superiority of the complexes over the Daltonian compound, but also the fact that this superiority is immediate and actually increases as time elapses. This is because the complexes by nature of their solubility characteristics furnish sufficient soluble cadmium to be effective over a longer period of time. Advantage can be taken of these solubility characteristics in a different manner so that a great flexibility in effective dosage is achieved. Either a large dosage can be applied at infrequent intervals or a low dosage at more frequent intervals.

As regards the flexibility of dosage, another test in which plots treated on June 19 and July 10 with 1, 2, 4, and 6 ounces of complex A per 1000 sq. ft. showed only a few spots beginning to appear in the plots receiving the 1 ounce treatments by August 11, a date on which untreated plots showed 412 spots per 40 sq. ft. The plots receiving the 2, 4, and 6 ounce treatments remained clean. It is thus obvious that very low dosages of the complexes contemplated herein can be applied and give effective control. However, the higher dosages remain effective longer.

In another test, complexes A and B proved superior to Cd(OH)₂ and CdSO₄ in reducing dollar spot. The materials were applied to the turf as aqueous sprays on July 3 when untreated plots were showing 74 spots per 10 sq. ft. The respective plots received the test materials at equivalent cadmium concentration which was 3 grams of cadmium per 1000 sq. ft. Readings taken after 10 days showed 80% reduction of the original infestation of dollar spot for complex A, 62% for complex B, none for CdSO₄, and 6% for Cd(OH)₂.

In another test, complexes A and B proved valuable for the control of large brown patch. These were tested comparatively against compounds F, G, and I. Large brown patch attacks the turf sporadically, the attacks being induced by hot humid weather. Compounds G and I are fungicides commonly used to control this fungus. The plots under test were treated throughout the season at ten day intervals beginning about June 1. The fungicides were applied as aqueous suspensions. Compound I was applied at the rate of 5 ounces, compound G at the rate of 3 ounces, compound F and complexes A and B at the rate of 3 grams of cadmium per 1000 sq. ft. The following Table 6 gives the results of the test. Large brown patch control in the table refers to areas involved rather than severity of attack.

TABLE 6

| Material Used | Large Brown Patch Control | Color and Growth of Uninfected Grass in the Treated Plot | Recovery of Infected Area, to October |
| --- | --- | --- | --- |
| Complex A | 50% | excellent | complete. |
| Complex B | 50% | do | Do. |
| Compound I | 50% | do | Do. |
| Compound G | almost complete. | poor | no recovery. |
| Compound F | no control | good | half filled in. |

While the two cadmium complexes did not give as complete control of the fungus as did compound G, they have the advantage over this compound of not injuring the uninfected grass in the treated area and of allowing new grass to grow in the areas after the fungus is killed or naturally dies; and these complexes have the advantage over compound I that they give good control of dollar spot which the compound does not do.

In tests against snow mold, complex A and compound G were applied as dry powders during December at the rate of 8 ounces of complex A and 4 ounces of compound G per 1000 sq. ft. Readings were taken the following April, at which time untreated check plots showed 88.6% of the grass infected with snow mold, the plots treated with compound G showed 2.6% of the grass infected and plots treated with complex A showed 5.5% of the grass infected. Compound G at the above rate is a standard treatment for snow mold. Advantages of using complex A are that it is much less toxic to humans than mercury compounds and therefore is safe to handle and to mix with diluents in the dry form and it is not corrosive to metallic equipment. Such mixtures made with complex A can immediately be applied to the turf whereas compound G mixtures are usually allowed to stand for a few days to reduce somewhat their injurious effect on grass. Furthermore, the residual complex A in the soil in the spring will aid in the control of dollar spot without injuring the grass as mercury treatments so frequently do.

Tests were also made for the control of damping-off on perennial rye grass, red top and bent grass by soil-treatment. In these tests the same weights of seed were planted in plots of the same containing complex A, and compounds H and I, and applied to the soil at the rates of 0.25 pound and 2.5 pounds of active material per 1000 sq. ft. The sprays were applied the day the seeds were planted and two more times at weekly intervals. All of the active materials at the rate of 2.5 pounds per 1000 sq. ft. injured all of the grass types, but complex A gave the least injury. At the rate of 0.25 pound per 1000 sq. ft., complex A gave the best stand followed by compounds H and I in order.

Tests were also made for the control of damping-off on perennial rye grass, red top and bent grass by seed-treatment. The materials tested were complex A and compounds H and I, at the rates of 0.25% and 2.5% of the seed weight The materials were applied by tumbling the seeds and the materials in barrels until the seeds were evenly coated with the materials. The treated seeds were then planted in plots of infected soil at the same rate as untreated seeds were planted in other plots. Complex A gave the best stand followed by compounds H and I.

The stand in untreated plots in both of the above tests was only about 20% of the stand in plots containing seed receiving complex A treatments.

In another seed-treatment test against damping-off, where untreated seed peas showed a 7% stand, i. e. 93% damping-off, seed peas treated by tumbling with 0.0625% of the seed weight of complex A showed a 63% stand.

Complex A also gave effective control of peach leaf curl in a spray containing one pound of the material per 100 gallons of spray.

The unitary cadmium complex A was prepared by dissolving 38.4 parts (all parts by weight) of $CrO_3$ in 710 parts of water and then dissolving 29.5 parts of cadmium oxide in this solution. A solution of 239 parts of copper sulfate pentahydrate in 750 parts of water was added to the chromic acid solution, resulting in a brown precipitate which was kept in suspension by stirring. Into this slurry was incorporated 31.1 parts of zinc oxide and then, with continued stirring, 306 parts of calcium hydroxide were incorporated. Stirring of the slurry was continued for several hours until the slurry assumed a uniform light yellow-green color which did not change on further stirring. The slurry was then passed through a grinder after which it was dried. The dried product was then ground to a powder.

The toxicant, dried at 90° C. until no more moisture was given off, had a light yellow-green color and examination of the dried material under X-rays disclosed the absence of diffraction lines characteristic of free oxides or hydroxides except for some excess lime.

The material was hydrophilic, wet easily with water, and readily dispersed in water. In making successive batches of this and other complexes, the relative proportions of the various ingredients can be varied up to 10% of the amounts stated without noticeably changing the color or X-ray pattern and with only slight variation of the biological properties. Greater changes in cadmium and lime content may be effected to change the cadmium solubility. Increasing amounts of cadmium oxide increase the cadmium solubility and increasing amounts of lime decrease cadmium solubility.

In preparing complex B, a slurry was prepared by mixing 200 parts of cadmium oxide and 3000 parts of water. Into the slurry were mixed 175 parts of sulfuric acid (specific gravity 1.84) and to the solutoin so prepared were added 5000 parts of water. Then 1945 parts of copper sulfate pentahydrate were added and dissolved. To the mix were added 2480 parts of lime and 500 parts of water. Stirring of the slurry thus prepared was continued to effect uniformity of dispersion. A solution of 325 parts of sodium dichromate dihydrate in 500 parts of water was mixed into the above slurry and stirring continued to give a uniform final slurry which was passed through a wet grinder and oven-dried at 90° C.

Examination of the dried material under X-rays disclosed the absence of diffraction lines characteristic of free oxides or hydroxides except for some excess lime. The material was hydrophilic, wet easily with water, and readily dispersed in water.

Complex C was prepared by forming a slurry from 240 parts of cadmium oxide and 3000 parts of water. To the slurry were added 210 parts of sulfuric acid (specific gravity 1.84) with agitation to complete solution. The solution was then diluted with 5000 parts of water, and 1945 parts of copper sulfate pentahydrate were added and the mix stirred until the sulfate was dissolved. Into this solution were stirred 253 parts of zinc oxide after which 2490 parts of lime were incorporated with an additional 1000 parts of water. Agitation was continued until a light blue precipitate was obtained which did not change under further stirring. The aqueous slurry thus obtained was ground, then dried at 40° C. until no more moisture was given off and the dried product was powdered.

Examination of the dried material under X-rays disclosed the absence of diffraction lines characteristic of free oxides or hydroxides except for some excess lime. The material was hydrophilic, wet easily with water, and readily dispersed in water.

Complex D was prepared by grinding together 205 parts of CrO₃, 5000 parts of water, and 184 parts of cadmium oxide. Then 3280 parts of calcium hydroxide were added and ground into the mass.

This complex, dried at 90° C. until no more moisture was given off, and powdered had a light yellow color. The material was hydrophilic, wet easily with water, and readily dispersed in water.

Complex E was prepared by forming a slurry from 132 parts of cadmium oxide and 2000 parts of water and then dissolving in the slurry 248 parts of CrO₃. Another slurry was prepared from 335 parts of zinc oxide, 500 parts of Cu(OH)₂ and 2400 parts of water. The two compositions thus prepared were combined and ball milled for 8 hours until a final slurry of a greenish yellow or olive drab color was obtained which did not change color under further milling. The final product of the milling was dried at 90° C. until no more moisture was given off and then powdered. The material was hydrophilic, wet easily with water, and readily dispersed in water.

The relative proportions of the ingredients in all of these complexes may be varied up to 10% as previously stated. As complex E contains no lime, the cadmium solubility is changed by varying the cadmium content.

From the previous description it will be seen that cadmium is common to all of the complexes and it is important that the cadmium be in a non-Daltonian complex which has the solubility characteristics previously stated, as distinguished from a Daltonian compound. Furthermore, the unitary cadmium complexes may contain varying kinds and amounts of elements other than cadmium and may contain other metals in addition to cadmium. It is desirable that the complex contain calcium since it imparts lower cadmium solubility and longer lasting qualities to the complex and it is preferred that the complex also contain at least two and preferably all of the metals copper, zinc and hexavalent chromium in association with the cadmium as these metals in such association appear to broaden the usefulness of the cadmium complex.

The amount of the unitary complexes that should be applied to grass will vary, depending upon the particular purpose in mind, between the limits of one-half ounce to one pound of the complex per 1000 sq. ft. of grass and, for best efficiency for the usual diseases, at the rate of between 1 and 8 ounces per 1000 sq. ft. of grass. Higher concentrations on the turf may have an adverse effect on the grass and lower concentrations are, in general, ineffective. Slurry compositions are prepared quite simply by adding water to the finely divided solid unitary complexes as the complexes wet easily. The dry complexes may be applied and hence there is no limit on the high concentration of the slurry when equivalent amounts of the complexes are applied to grass, the object being to apply the fungicide evenly and conveniently. Equally effective results for control of turf diseases have been obtained with dilute aqueous slurries and with the dried powder, the water being a convenient vehicle for evenly applying the small amount of complex required. Ordinarily where sprays are applied to turf it has been convenient to use slurries containing from 1 to 10 pounds of the complex per 100 gallons of water, that is, slurry concentrations from 0.12% to 1.2%. Aqueous slurries containing unitary complexes sprayed on plants in the manner ordinarily employed for foliage disease control, will be used at concentrations of the complex in the slurry varying between 0.002% and 2.0% depending on the purpose in mind and, for best efficiency for the usual diseases, at between 0.02% and 0.5% concentration. Higher concentration will, in general, be uneconomical and lower concentration ineffective in combating the fungi.

The complexes may be used alone or in combination with fertilizers and have been used very effectively with dry fertilizers derived from sewage, the proportion of the complex to the fertilizer being such that when the fertilizer is applied at the desired rate, the complex is applied at between 1 and 8 ounces per 1000 sq. ft. However, the complexes have not been found to be compatible when applied as slurries together with liquid solutions of all fertilizers nor are they compatible when applied together with tetramethyl thiuram disulfide; but after a lapse of 24 hours either fungicide may be applied to areas previously treated with the other without interfering with the fungicidal action of either or otherwise producing undesirable results.

The unexpected operability and advantages of the complexes appear to be explained by their water-solubility characteristics, and are thought to be due to the high concentration of cadmium yielded by the fresh complex, this yield decreasing as the complex is washed by rain and the like. When the disease problem requires a high initial level of cadmium for proper control, a complex is selected which has this high initial cadmium solubility and even though the solubility decreases following successive washes, it will still provide residual control once the high initial inoculation of disease is destroyed. Where it is unnecessary to have such a high initial cadmium solubility, a complex is selected which has a relatively low solubility. The cadmium solubility of the complexes may be varied as previously stated although the same solubility characteristics appertain to these complexes whether they are initially highly soluble or only slightly soluble. Whether the initial solubility be low or high the solubility characteristics of these complexes is such that their initial effectiveness is high and for a given initial effectiveness their effective life is longer than is the life of a Daltonian compound. Thus great flexibility of dosages of material to be used can be obtained by the selection of complexes of proper initial solubility to meet the particular conditions at hand. However, whether these solubility characteristics are the sole explanation of the superiority of the unitary complexes herein described, or even significant, the superiority of these complexes over Daltonian compounds is evident. Thus the unitary cadmium complexes have distinct advantages over Daltonian cadmium compounds in inhibiting fungi, particularly on plants.

What is claimed is:

1. A fungicide comprising a basic berthollide complex oxy-compound consisting essentially of oxy-compounds of cadmium and calcium and at least one metal of the group consisting of copper and zinc combined in the berthollide; the berthollide being characterized by inhibitory properties toward the fungus causing dollar spot, and further characterized in that in aqueous slurries containing undissolved berthollide an increase in the proportion of undissolved berthollide to the water gives less than a proportional increase in the amount of cadmium in solution; and further characterized by a phytotoxicity below that of cadmium hydroxide; the berthollide being present in an amount sufficient to provide, as compared with the separate fungicidal properties of cadmium hydroxide and calcium hydroxide, an improved fungicide that is more effective against dollar spot than cadmium hydroxide at the same concentration of cadmium.

2. A method of inhibiting the growth of dollar spot which comprises applying to the earth at a rate between 1 and 8 ounces per 1000 square feet, a fungicide comprising a basic berthollide complex oxy-compound consisting essentially of oxy-compounds of cadmium and calcium and at least one metal of the group consisting of copper and zinc combined in the berthollide; the berthollide being characterized by inhibitory properties toward the fungus causing dollar spot, and further characterized in that in aqueous slurries containing undissolved berthollide an increase in the proportion of undissolved berthollide to the water gives less than a proportional increase in the amount of cadmium in solution; and further characterized by a phytotoxicity below that of cadmium hydroxide; the berthollide being present in an amount sufficient to provide, as compared with the separate fungicidal properties of cadmium hydroxide and calcium hydroxide, an improved fungicide that is more effective against dollar spot than cadmium hydroxide at the same concentration of cadmium.

3. A fungicide comprising, as an active ingredient, a basic complex material of a light yellow-green color consisting essentially of oxy-compounds of cadmium, calcium, copper, zinc, chromium and sulfur in the proportion corresponding by weight to approximately 4.5 parts of CdO, 11.7 parts of CuO, 4.8 parts of ZnO, 5.9 parts of $CrO_3$, 11.7 parts of $SO_3$ and 32.9 parts of CaO; the material being characterized by inhibitory properties toward the fungus causing dollar spot, and further characterized in that in aqueous slurries containing said material in an undissolved form an increase in the proportion of said undissolved material to the water gives less than a proportional increase in the amount of cadmium in solution; and further characterized by a phytotoxicity below that of cadmium hydroxide; the said material being present in an amount sufficient to provide, as compared with the separate fungicidal properties of cadmium hydroxide and calcium hydroxide, an improved fungicide that is more effective against dollar spot than cadmium hydroxide at the same concentration of cadmium.

4. A method of inhibiting the growth of dollar spot which comprises applying to turf a fungicide comprising, as an active ingredient, a basic complex material of a light yellow-green color consisting essentially of oxy-compounds of cadmium, calcium, copper, zinc, chromium and sulfur in the proportion corresponding by weight to approximately 4.5 parts of CdO, 11.7 parts of CuO, 4.8 parts of ZnO, 5.9 parts of $CrO_3$, 11.7 parts of $SO_3$ and 32.9 parts of CaO; the material being characterized by inhibitory properties toward the fungus causing dollar spot, and further characterized in that in aqueous slurries containing said material in an undissolved form an increase in the proportion of said undissolved material to the water gives less than a proportional increase in the amount of cadmium in solution; and further characterized by a phytotoxicity below that of cadmium hydroxide; the said material being present in an amount sufficient to provide, as compared with the separate fungicidal properties of cadmium hydroxide and calcium hydroxide, an improved fungicide that is more effective against dollar spot than cadmium hydroxide at the same concentration of cadmium; the said active ingredient being applied to the turf at a rate of between 1 and 8 ounces per 1000 square feet.

FRED R. WHALEY.

REFERENCES CITED

The following references are of record in the file of this patent:

UNITED STATES PATENTS

| Number | Name | Date |
|---|---|---|
| 2,177,197 | Cummins | Oct. 24, 1939 |
| 2,196,082 | Roberts | Apr. 2, 1940 |
| 2,226,573 | O'Brien | Dec. 31, 1940 |
| 2,243,824 | Benedict et al. | May 27, 1941 |
| 2,288,810 | Leatherman | July 7, 1942 |
| 2,306,270 | Leverenz | Dec. 22, 1942 |
| 2,313,589 | Seibert et al. | Mar. 9, 1943 |
| 2,403,228 | McCord et al. | July 2, 1946 |
| 2,434,764 | Froelich | Jan. 20, 1948 |

FOREIGN PATENTS

| Number | Country | Date |
|---|---|---|
| 577,302 | Great Britain | May 13, 1946 |
| 536,923 | Great Britain | May 30, 1941 |

OTHER REFERENCES

Mellor: "Comprehensive Treatise on Inorganic and Theoretical Chemistry" (N. Y.), vol. 4, pp. 558, 656 and 686.

"Application of Instruments in Chemistry," Burk and Grummitt, editors, Publ. by Interscience Publishers, Inc., N. Y., 1945, pp. 41 to 68. (Copy available in Sci. Library.)

Mellor: "Comprehensive Treatise on Inorganic and Theoretical Chemistry"; vol. 1; page 519, Longmans, Green and Co., N. Y. (Copy available in Division 59.)

Mellor: "Modern Inorganic Chemistry"; pp. 53 to 55, Longmans, Green & Co., N. Y. (Copy available in Div. 59).

Certificate of Correction

Patent No. 2,573,739 November 6, 1951

FRED R. WHALEY

It is hereby certified that error appears in the printed specification of the above numbered patent requiring correction as follows:

Column 3, line 53, in the table, second column thereof, strike out "$CdO,Cd(OH)_2$," and insert the same in line 54, before "$CdCl_2$,"; column 4, line 15, for "SdSe" read *CdSe*; column 6, Table 5, in the heading to column 3 thereof, for "June" read *June 9*; column 7, line 67, before "containing" insert *area of infected soil. Sprays were prepared*; column 8, line 67, for "solutoin" read *solution*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*